United States Patent [19]
Geist

[11] Patent Number: 5,546,596
[45] Date of Patent: Aug. 13, 1996

[54] METHOD AND APPARATUS FOR INTEGRATED LOCAL AND EXPRESS ROUTING IN A MULTIPROCESSOR

[75] Inventor: Alan Geist, Hillsboro, Oreg.

[73] Assignee: Intel Corporation, Santa Clara, Calif.

[21] Appl. No.: 415,084

[22] Filed: Mar. 30, 1995

Related U.S. Application Data

[63] Continuation of Ser. No. 111,199, Aug. 24, 1993, abandoned.

[51] Int. Cl.$^6$ ............................................. G06F 13/00
[52] U.S. Cl. ............... 395/200.02; 395/800; 395/200.01; 395/280; 326/41; 370/60; 370/85.9; 370/94.3
[58] Field of Search .................... 395/800, 200, 395/280, 200.01, 200.02; 326/41; 370/85.9, 94.3, 60

[56] References Cited

U.S. PATENT DOCUMENTS

| | | | |
|---|---|---|---|
| 4,742,511 | 5/1988 | Johnson | 370/85.9 |
| 5,134,690 | 7/1992 | Samatham | 395/200.01 |
| 5,175,733 | 12/1992 | Nugent | 370/94.3 |
| 5,280,474 | 1/1994 | Nikolls et al. | 370/60 |
| 5,338,984 | 8/1994 | Sutherland | 326/41 |
| 5,367,642 | 10/1994 | Dally | 395/200.02 |

*Primary Examiner*—Alyssa H. Bowler
*Assistant Examiner*—Denise Tran
*Attorney, Agent, or Firm*—Blakely, Sokoloff, Taylor & Zafman

[57] ABSTRACT

A router for routing a message among nodes in an N dimensional network of processor nodes. The router includes a message logic unit determining in which direction the message is traveling in the network. The router features a number of (D) of express ports, each express port having an input for inputting and an output for outputting the message in a corresponding one of (D) express directions. A routing logic unit in the router is capable of transmitting the message in a selected express direction through a corresponding local port, each local port inputting and outputting the message in one dimension of the network. The routing logic unit also includes express routing logic that is capable of transmitting the message in the selected express direction through a corresponding express port. The message logic unit includes detection logic for determining the distance in each dimension remaining to be traveled by the message to a destination node. The routing logic unit transmits the message in the express direction through the express port if the remaining distance in the express direction is greater than or equal to a quantity S, where S is greater than or equal to 2N/D. The routing logic unit transmits the message in the express direction through the local port if the remaining distance in the express direction is less than S.

8 Claims, 8 Drawing Sheets

METHOD AND APPARATUS FOR INTEGRATED LOCAL AND EXPRESS ROUTING IN A MULTIPROCESSOR

This is a continuation of application Ser. No. 08/111,199, filed Aug. 24, 1993, abandoned.

BACKGROUND OF THE INVENTION

1. Field of the Invention

The present invention relates to the field of data transfers between nodes in a parallel processing system, and more particularly, to a method and apparatus for integrated local and express routing in a multiprocessor.

2. Art Background

In recent years, parallel processing computer architectures have demonstrated substantial performance advantages over more traditional sequential computer architectures. In particular, as computational needs have grown, and the performance advantages offered by parallel processing have come to be recognized, highly parallel computer architectures have generated considerable interest. One such parallel computer architecture comprises a two-dimensional mesh of processor nodes, each of these nodes having an independent processor with computing power.

FIG. 1 illustrates a two dimensional mesh of nodes 102, each node being coupled to a router 104. The processing nodes together form a large parallel processing system. The routers 104 are used to transfer messages between the processor nodes 102.

The four directions in which a message can travel within the mesh architecture are designated as North, East, West and South. Accordingly, as shown in FIG. 1, each message routing chip includes eight separate routing ports, a pair of North input and output routing ports, a pair of East input and output routing ports, a pair of West input and output routing ports, and a pair of South input and output routing ports. When orienting a message routing chip within the mesh topology, the East direction is chosen to correspond to the positive x direction, the West direction is chosen to correspond to the negative x direction, the North direction is chosen to correspond to the positive y direction, and the South direction is chosen to correspond to the negative y direction. Each message routing chip 104 also has a processor port comprising a uni-directional input port for receiving data from processor node 102 and a uni-directional output port for delivering data to the processor node.

When data is to be sent from a first processor node to a second processor node, the message routing chip coupled to the first processor node initially receives the data through its input processor port. The data then travels through the mesh until it reaches the appropriate message routing chip coupled to the second processor node. The data is delivered to the second processor node via that message routing chip's output processor port. In a two dimensional mesh, data typically is first routed only in the x direction, and then in the y direction. When a message is received by a message routing chip, a header in the message contains a word indicating the displacement (in nodes) in the x dimension that the message must travel in the mesh to reach the x coordinate of the destination node. A sign bit in the header also indicates the direction of travel in the x dimension. Similarly, another word in the header of the message indicates the displacement (in nodes) in the y dimension that the message must travel to reach the y coordinate of the destination node, and includes a sign bit indicating the direction of travel, either North or South.

As a message passes through each router in the x dimension, the displacement is decremented. When a router receives a message with the x displacement equal to zero, the message is no longer routed in the x dimension. Rather, the same process starts over again in the y dimension. As the message passes through each router in the y dimension, the y displacement is decremented. When a router receives a message with both the x and y displacements equal to zero, the message is delivered to the router output port to the processor node associated with that final router.

A further description of router technology may be found in U.S. patent application Ser. No. 892,535, filed on Jun. 1, 1992, and assigned to the assignee of the present invention, and in C.M. Flaig, VLSI Mesh Routing Systems, Master's Degree thesis, 5241:TR:87, California Institute of Technology, May, 1987.

One of the goals of any message routing system is to increase the message transmission bandwidth. One measurement of bandwidth is the bi-sectional bandwidth in bytes per second. The bi-sectional bandwidth is measured by creating an imaginary cut between any two routers and measuring how much information flows in one direction across the cut.

There are two obvious ways to increase the bi-sectional bandwidth. First, the frequency of the system may be increased. However, the technology to do so is currently prohibitively expensive and results in increased power consumption. Further, technological barriers, such as inherent semiconductor delays, limit the possible maximum frequency.

Another way to increase bandwidth would be to increase the bus width. However, note that every router has ten uni-directional buses—four pairs of North, East, West and South buses and one pair of buses for communicating with the processor node. Thus, for every bit added to increase the bus width, ten bits are added to the routing chip used in a two dimensional mesh. Routing chips with 16 bit bus widths already have approximately 300 pins and are on the order of two inches square. The addition of substantially more pins would create an unacceptable package size that would occupy too much real estate on the circuit boards into which the routers are plugged.

A more feasible way to increase bi-sectional bandwidth is to periodically place additional "express" routers in the mesh that are dedicated only to transferring messages over long hops between the local routers already present in the mesh. Referring to FIGS. 2 and 3, the two dimensional mesh comprises a network of local routers 202. An express router 204 is interposed into the network after every fourth local router in both the x and y dimensions.

The operation of the express router 204 is described in more detail with respect to FIGS. 3 and 4. FIG. 3 illustrates a row of the two dimensional mesh of FIG. 2, including express routers 204 used to route messages in the x dimension.

FIG. 4 illustrates the structure of an express router 204. In the positive x direction, messages are input to the XP$^+$ IN or LOC$^+$ IN ports depending on whether the message was sent by an express router or a local router, respectively. Messages are output on ports XP$^+$ OUT or LOC$^+$ OUT to an adjacent express or local router, respectively, depending on the conditions described below. The express router operates in the negative x direction in an analogous manner using the XP$^-$ IN, LOC$^-$ IN, XP$^-$ OUT and LOC$^-$ OUT ports.

In the example of FIG. 3, each express router for a particular dimension is separated by four local routers. In this case, the network is said to have a "skip size" of four routers. When the express router 204 receives a message from an adjacent local router or from another express router, it determines whether the displacement in the dimension handled by the router is greater than or equal to the skip size. If so, the express router transmits the message to the next express router in that dimension through ports XP⁺ OUT or XP⁻ OUT over an express bus coupling the two express routers, and the displacement in that dimension is decremented by the skip size. If the displacement is less than the skip size, then the express router 204 transmits the message through ports LOC⁻ OUT or LOC⁺ OUT to the next adjacent local router 202 over a local bus. This process continues until the message reaches its final destination and the displacements in all dimensions have been decremented to zero.

The advantages and disadvantages of using express routers will now be discussed. The express routers of FIGS. 2 and 3 provide two paths past any point in the mesh, thus doubling the bi-sectional bandwidth. In one dimension, this increase in performance is obtained by adding only 25% more routers for a skip size of four. In two dimensions, 50% more routers are added to double the bandwidth for the same skip size. Relatively speaking, the increase in the number of components is not bad considering the gain in bandwidth. However, as mentioned above, each express router occupies approximately two inches square of board space, while board space is at a premium. Further, for short hops the addition of the express routers increases message latency, the time it takes for a message to travel from one node to another. Referring to FIG. 3, one can see that in the simplest case of a short hop between the two nodes connected to the local routers 202 that straddle an express router 204, the message latency is increased from two routers to three routers.

It is desirable to obtain an increase in bi-sectional bandwidth while at the same time minimizing the number of extra components required in the mesh. In addition, it is desirable to reduce latency and, because of circuit packaging constraints, to keep the pin count to a minimum.

SUMMARY OF THE INVENTION

The present invention provides a router for routing a message among nodes in an N dimensional network of processor nodes. The router includes a message logic unit for determining in which direction the message is traveling in the network. The router features a number of (D) of express ports, each express port having an input for inputting and an output for outputting the message in a corresponding one of (D) express directions. A routing logic unit in the router is capable of transmitting the message in a selected express direction through a corresponding local port, each local port inputting and outputting the message in one dimension of the network. The routing logic unit also includes express routing logic that is capable of transmitting the message in the selected express direction through a corresponding express port. The message logic unit includes detection logic for determining the distance in each dimension remaining to be traveled by the message to a destination node. The routing logic unit transmits the message in the express direction through the express port if the remaining distance in the express direction is greater than or equal to a quantity S, where S is greater than or equal to 2N/D. The routing logic unit transmits the message in the express direction through the local port if the remaining distance in the express direction is less than S.

DETAILED DESCRIPTION OF THE INVENTION

The present invention provides a method and apparatus for integrated local and express routing in a multiprocessor. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail to avoid unnecessarily obscuring the present invention. In particular, while the present invention will be described with emphasis on a two-dimensional mesh, it will be appreciated that the present invention is in no way limited to two dimensions but rather finds application in networks of any dimension.

Figure 5A:
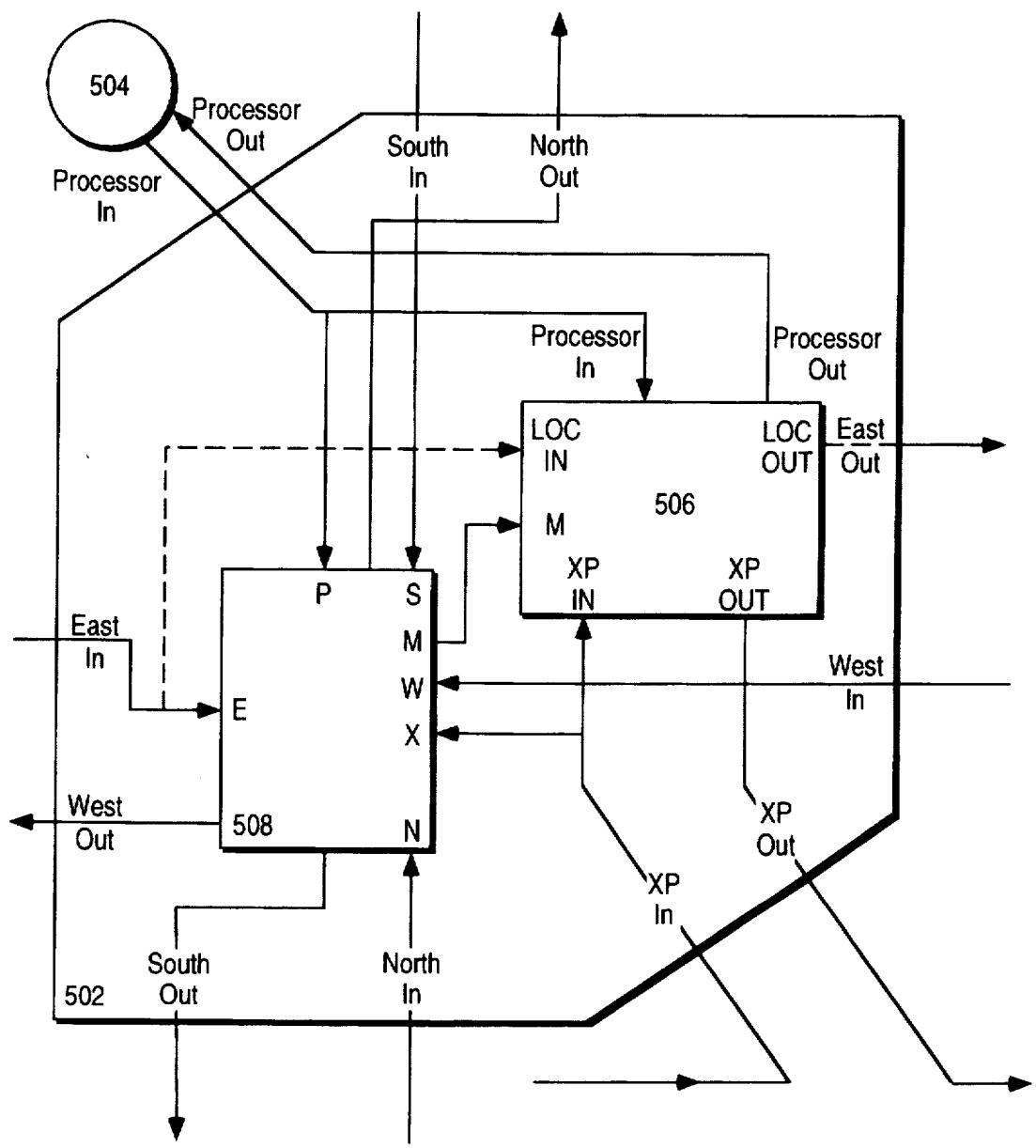
FIG. 5A is a block diagram of one embodiment of the integrated router of the present invention.

FIG. 5a illustrates an embodiment of the integrated local/express router 502 of the present invention for use in a two-dimensional network. The router 502 is coupled to a processor node 504 through processor input and output ports in the router 502. In this two-dimensional case, the router 502 also includes four pairs of North, East, West and South local input and output ports.

A novel feature of this embodiment is the integration of the express routing function along with the local routing function into the integrated router 502. An express logic circuit 506 is physically and logically integrated into the routing chip 502 so that the router 502 can perform either local or express routing in one direction of one dimension of the network. Here, router 502 is configured to perform either local or express routing in the East or positive x direction.

The express logic circuit 506 includes a local input and a local output (LOC IN and LOC OUT), an express input and an express output (XP IN and XP OUT), and a processor input and a processor output (PROCESSOR IN and PROCESSOR OUT), as shown. Here, the router is configured to receive messages traveling eastward over an express bus at XP IN, and to transmit messages eastward over the express bus through XP OUT. In this configuration, the East-going messages may also be received over the local bus as LOC IN and transmitted locally out of LOC OUT. In this embodiment of the present invention, processor 504 has direct access to both the local and express ports through the processor input and output of express logic circuit 506.

The router also includes a message status unit (MSU) 508, which performs functions found in conventional routers. The status unit 508 is coupled to receive messages over the local, express and processor input ports. The MSU 508 examines the message header to determine whether the message has reached its destination. The unit also provides message information to the express logic circuit 506 over line M, as described in more detail below.

Figure 6:
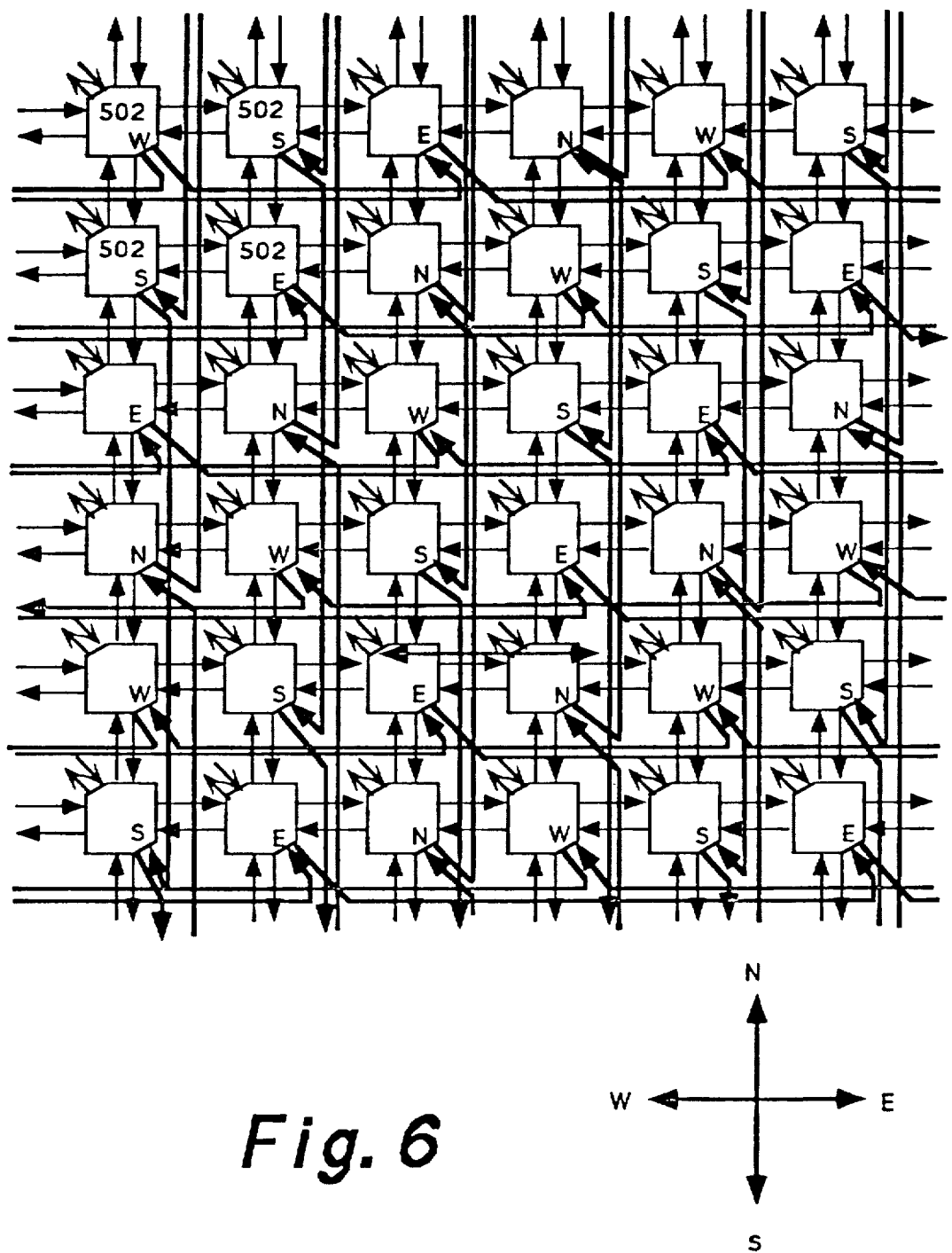
FIG. 6 illustrates a two dimensional mesh incorporating an integrated router of the present invention.

The router 502 is shown incorporated into the network of FIG. 6. Here, the router 502 designates not only routers that can perform both local and express routing in the East direction, but in any one direction in one dimension. That is, integrated router 502 can perform integrated routing in either the North, East, West or South direction through proper configuration of express routing logic 506 in router 502. The configuration can be set up using two control pins (not shown). Alternatively, the router 502 can be software configured on power up. IEEE Standard 1149, also known as JTAG (Joint Test Action Group), provides one possible method for performing such programming. Based on the control pin input or programming, the system designer can set the direction in which the express function of the integrated router is to be oriented. In either case, the wiring connected to the XP IN and XP OUT pins must also be oriented in the proper direction.

Another feature of the present invention is the network topology utilizing the integrated router 502. In this embodiment, each router 502 routes express messages in only one direction in one dimension. However, messages must be able to traverse the network in all directions in all dimensions. The present invention solves this problem by grouping the routers together in "orthogonal" sets, where each set includes four routers, each routing express messages in a different direction. In FIG. 6, the designations W, S, E and N are marked on the express routing ports of routers 502 to indicate that a router handles express routing in either the West, South, East or North directions, respectively. The express output port of a router 502 is coupled to the express input port of the nearest router 502 that is in the same row or column and that handles express routing in the same direction. For example, the express input port of the Western-oriented router 502 in the upper left corner is coupled to the express output port of the nearest Western-oriented router to the East in the top row.

Figure 7:
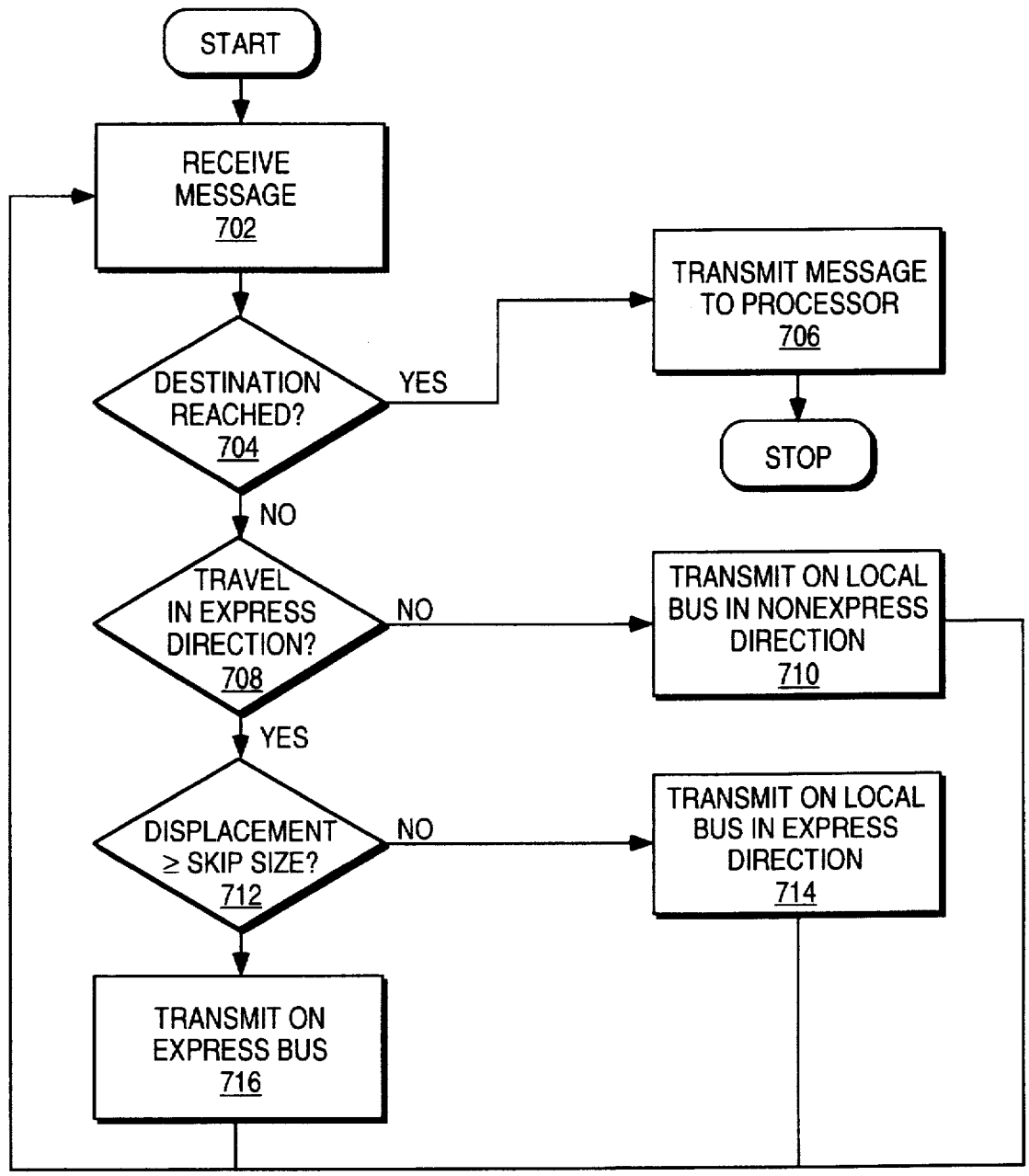
FIG. 7 is a flowchart of the method of the present invention.

Referring now to FIG. 7, the operation of the present invention will be described. The router 502 first receives the message on one of its input ports and the MSU 508 determines whether the router is coupled to the destination node designated by the message header (step 702, 704). In one embodiment, this condition is detected when the displacement words that indicate the distances (in nodes) to be traveled in all dimensions have decremented to zero. If so, the router forwards the message to the processor 504 (step 706).

On the other hand, if the router receiving the message is not coupled to the destination node, then the MSU 508 determines whether the message is traveling in the express direction of router 502, i.e., the direction handled by express logic circuit 506 (step 708). If so, the MSU enables express logic circuit 506 over one of lines M. As described above, in one embodiment for a two-dimensional mesh, messages travel first in the x dimension and then in the y dimension, with the direction in each dimension being indicated by the sign bit in the corresponding displacement words in the message header. The MSU determines whether the message is traveling in the express direction by examining these displacement words, as would be obvious to one skilled in the art.

Refer again to the router of FIG. 5a and assume for now that the router is configured to provide express routing of messages in the East direction, as shown. If, for example, MSU 508 determines that the message is traveling in the West direction, MSU 508 will direct router 502 to output the message on the local WEST OUT port to the WEST IN port of the nearest neighbor router (step 710). If, however, MSU 508 detects that the message is traveling in the express direction (here the East), then, over one of lines M, MSU 508 will feed to express logic 506 the displacement word for the dimension in which the express direction lies. Express logic circuit 506 will examine the displacement word and compare the displacement with the skip size (step 712). If the message is only traveling for a short hop in the express direction and the displacement is less than the skip size, then express logic 506 will route the message out of the local EAST OUT port to the EAST IN port of the nearest neighbor router (step 714). If however, the message is to travel over a relatively long hop and the displacement is greater than or equal to the skip size, then express logic circuit 506 will route the message in the East direction out the express port (XP OUT) to the nearest express EAST IN port in the same row of the two-dimensional mesh (step 716).

Figure 1:
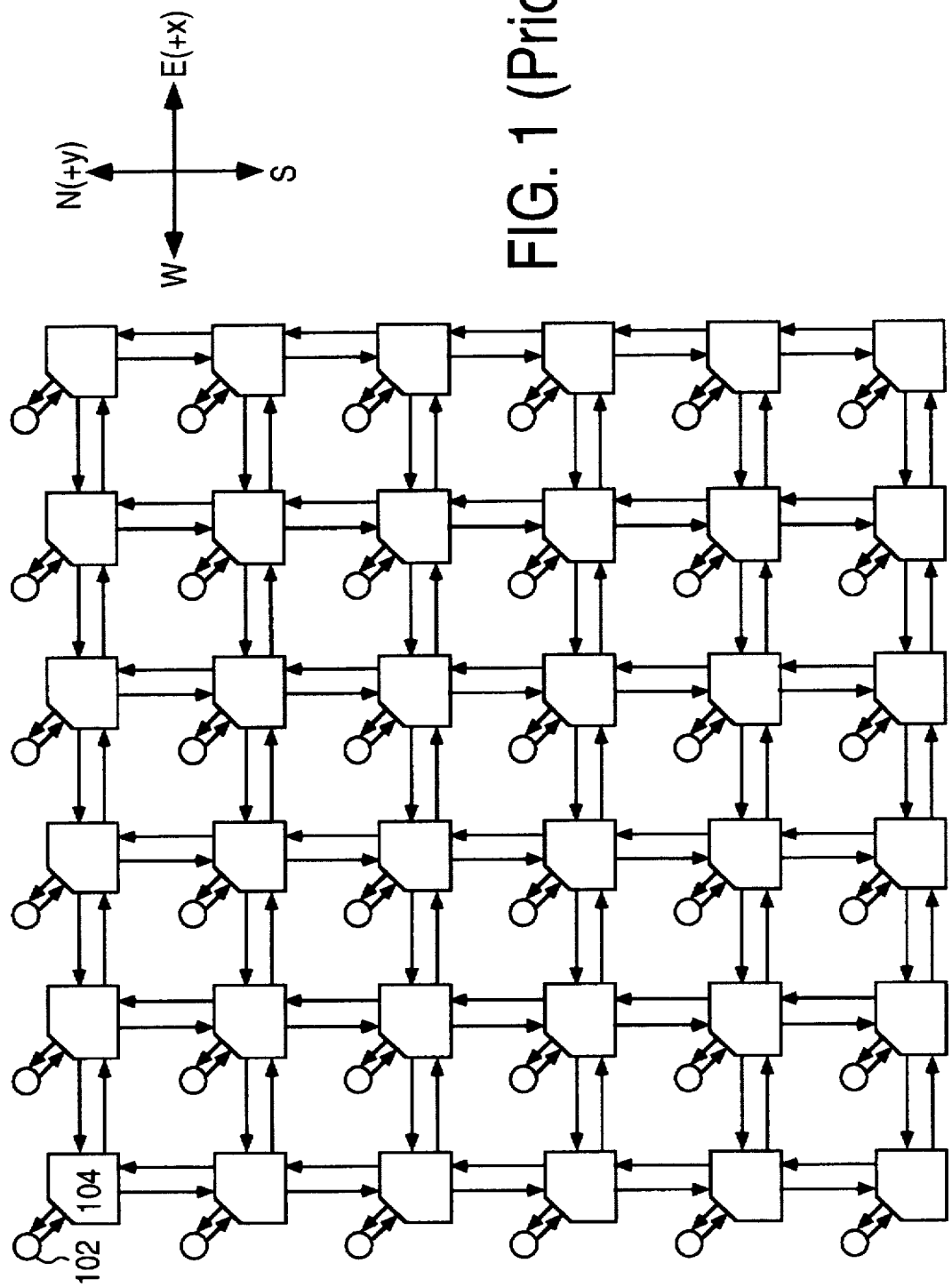
FIG. 1 illustrates a conventional two dimensional mesh of routers.
Figure 2:
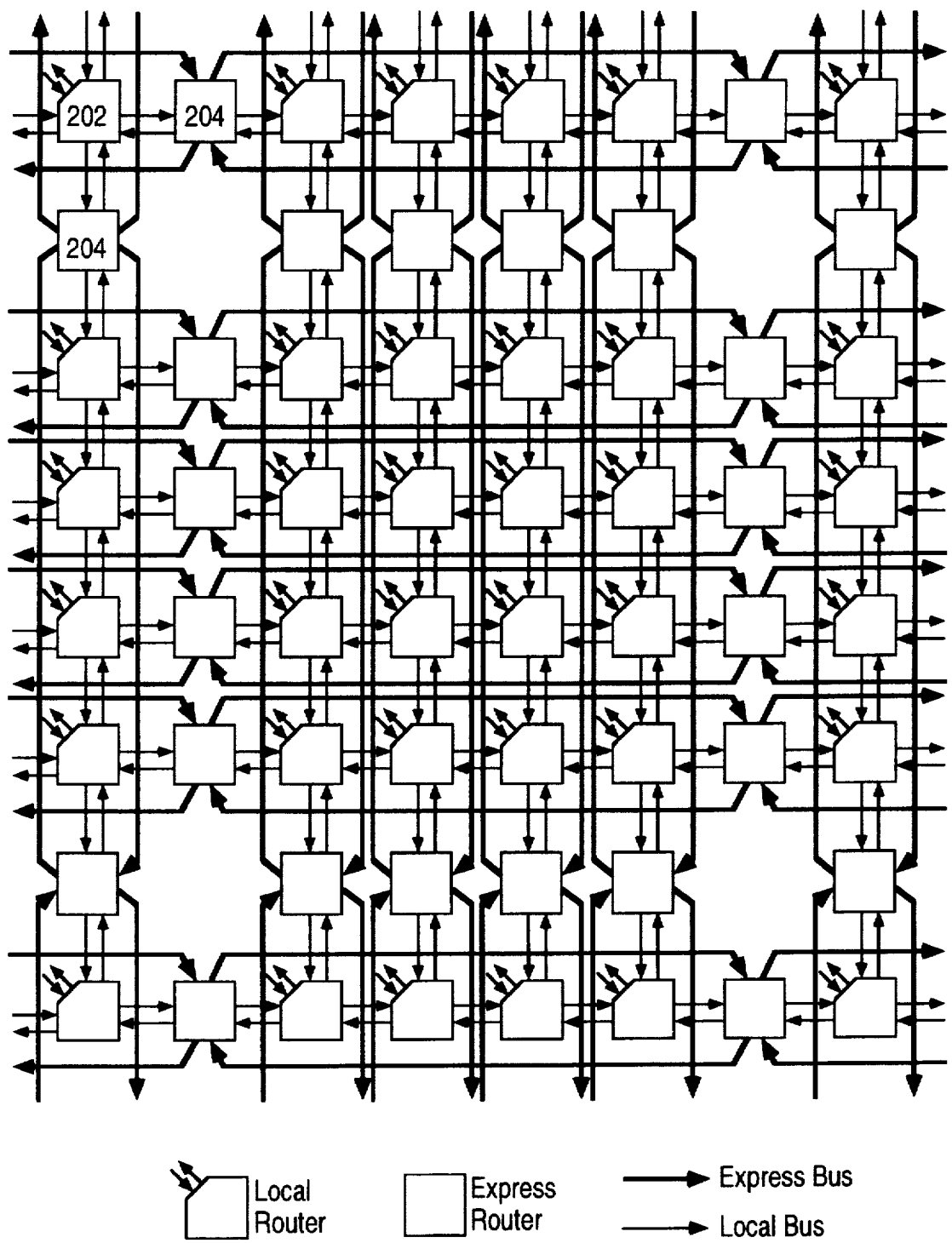
FIG. 2 illustrates a conventional two dimensional mesh incorporating express routers.
Figure 3:
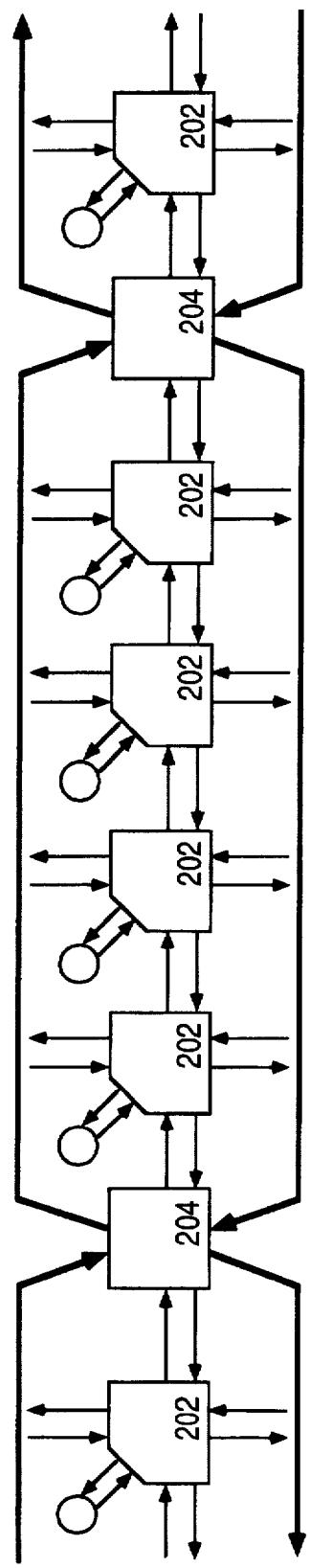
FIG. 3 is a block diagram of a row from the mesh of FIG. 2.
Figure 4:
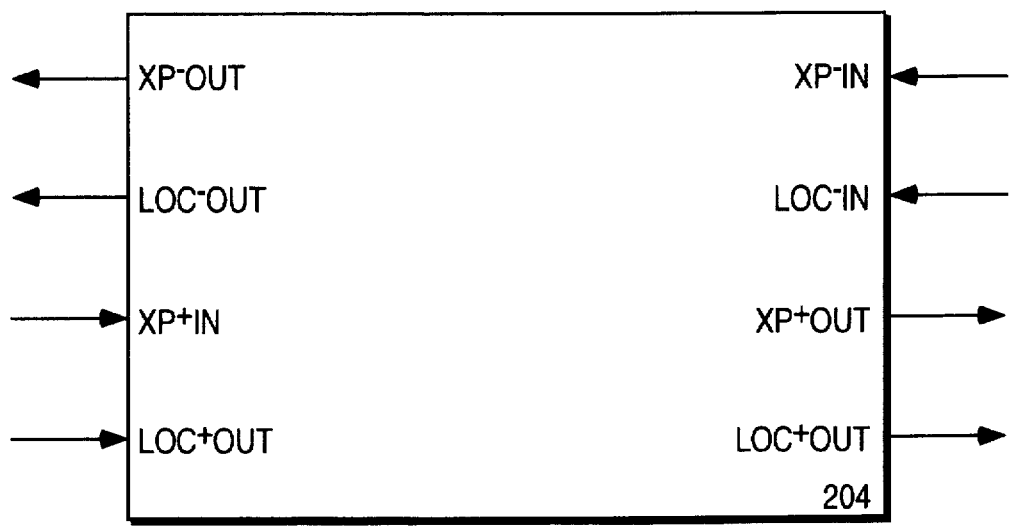
FIG. 4 is a block diagram of a conventional express router.

An examination of FIG. 6 reveals that in this embodiment the minimum skip size between any two routers pointing in the same express direction is four. Compared to the prior art express routing topology of FIG. 2, the present invention has achieved the same skip size. However, recall that in two dimensions the prior art topology required the addition of 50% more components (express routers) to double the bisectional bandwidth. In contrast, the present invention achieves the same result without adding any components. Rather, the present invention only requires an increase in the pin count per router by 20% (two pins added to a previous total of 10) in this embodiment. Thus, the present invention achieves an enormous savings in circuit board real estate.

The present invention can be generalized both in terms of the number of dimensions in the network, and the number of directions that may be handled by each integrated router. For example, using the mono-directional router thus far described, in a three-dimensional hypercube, an orthogonal set of routers would consist of six routers, each router pointing in either the North, East, West, South, In or Out direction, respectively. For the mono-directional express router in three dimensions, it follows that if these six routers were placed adjacent to each other, the minimum skip size for this topology would be six. Recall that for the mono-directional express router in two-dimensions, the minimum skip size is four. In general, the minimum skip size in an N-dimensional network topology using mono-directional express routers is 2N.

The routers can also be generalized in terms of the number of express directions each router handles. The express routing logic 506 may be modified to perform integrated express routing in more than one direction by adding another pair of LOC IN and LOC OUT ports and another pair of XP IN and XP OUT ports for each additional direction. In a two-dimensional mesh, if each router performs integrated express routing in two directions, it follows that the nearest integrated router that performs integrated express routing in one of the two directions performed by the first router will be separated only by a minimum skip size of two. In the three-dimensional case, a topology using bi-directional express routers will be separated by a minimum skip size of three, while a topology using tri-directional express routers will be separated by a skip size of two. In general, for an N-dimensional mesh using integrated routers performing integrated express routing in D directions, the minimum skip size for the N-dimensional network is 2N/D.

Each time an integrated direction is added to a router, the bisectional bandwidth increases and/or the skip size decreases accordingly. However, this advantage is obtained only at the sacrifice of adding a pair of express pins to the router for each express direction added. Of course, one overall advantage of the present invention is that it allows the network designer to trade off bisectional bandwidth and skip size against pin count to find the optimal balance.

Another advantage of the present invention as embodied in FIG. 5a is that it achieves express routing with no increase in message latency. Because the express routing function is logically integrated with the local router, a message traveling in short hops throughout the network is never subject to the delay that would be caused by passing through a separate, independent express router, such as that found in the prior art of FIG. 2.

Figure 5B:
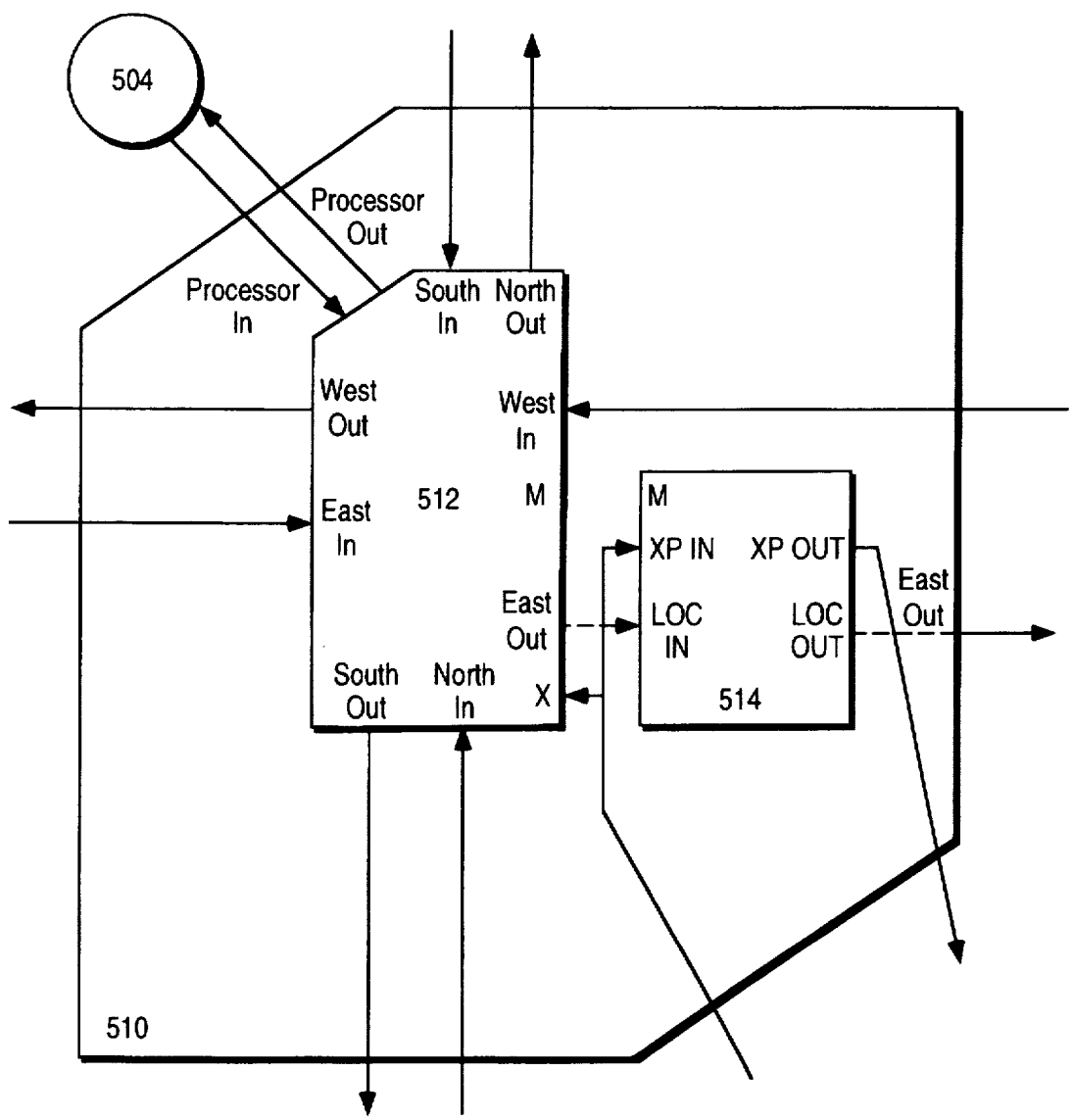
FIG. 5B is a block diagram of another embodiment of the integrated router of the present invention.

Another embodiment of the router of the present invention as shown in FIG. 5b exhibits the same advantages as the router of FIG. 5a, except with respect to latency. The router 510 includes two functional blocks that are physically integrated, but not logically integrated on the same chip. The first block 512 performs the traditional local routing functions. The second block 514 performs express routing in one direction of one dimension, here in the East or positive x direction. One can see that a message traveling locally in the East direction must pass through both block 512 and block 514, thus adding to message latency. Further, unlike the embodiment of FIG. 5a, the processor 504 does not have direct access to the express ports XP IN and XP OUT. Although this embodiment results in an increase in message latency, it exhibits the advantage that the design of such a device is substantially less complex, and requires much less circuitry.

Although the invention has been described in conjunction with preferred embodiments, it will be appreciated that various modifications and alterations might be made by those skilled in the art without departing from the spirit and scope of the invention.

We claim:

1. An N dimensional network comprising a plurality of processor nodes, in which N is a value of at least one, the network further comprising a plurality of integrated routers for routing a message from a source processor node of the plurality of processor nodes to a destination processor node of the plurality of processor nodes in 2N orthogonal directions, said each integrated router coupled to a processor node of the plurality of processor nodes, said each integrated router further coupled to a plurality of adjacent routers, said each adjacent router located in an identified direction from the integrated router, and said each integrated router coupled to at least one non-adjacent router, said each non-adjacent router located in an identified direction from the integrated router, said each integrated router comprising:

a processor pen to communicate the message between the coupled processor node and the integrated router;

2N local ports to receive the message from and output the message to the adjacent routers in 2N orthogonal directions, each local port having an identified direction, said each local port further comprising a local input to receive the message from the identified direction and a local output to output the massage to the identified direction;

M express ports, 2N> M>=1, to receive the message from and output the message to the non-adjacent routers in less than 2N orthogonal directions, each express port having an identified direction, said each express port further including an express input to receive the message from the identified direction and an express output to output the message to the identified direction;

a message status unit coupled to said each local port and said each express input, said message status unit to select a direction to route the message, and if said direction to route the message is not equal to the directions identified by the express ports of the router, said message status unit to output the message through the local output having an identified direction equal to the direction to route the message; and a muting logic unit coupled to the message status unit, said routing logic unit further coupled to said each express port and said each local port having the same identified direction as said each express port, and if said direction to route the message is equal to the directions identified by the express ports of the router, said routing logic unit selectively outputting the message through the express output or the local output in said direction to route the massage, said muting logic unit further comprising logic to select the express output to output the received message if the remaining distance in said direction to route the message is greater than a value D, where D is indicative of a number of processor nodes between the router and the destination processor node in said direction to route the message, D having a value of at least one.

2. The router of claim 1, the message status unit further comprising logic for determining a remaining distance to the destination processor node to be traveled by the message in each identified direction.

3. The router of claim 1, the routing logic unit further comprising logic to select the local port for outputting the message if the remaining distance in the selected direction is less than or equal to a value D, where D is indicative of a number of processor nodes in the selected direction between the router and the destination processor node, D having a value of at least one.

4. An N dimensional network, in which N has a value of at least one, comprising:

a plurality of processor nodes;

a plurality of integrated routers, each integrated router coupled to a processor node of the plurality of processor nodes, the integrated routers for routing a message from a source processor node of the plurality of processor nodes to a destination processor node of the plurality of processor nodes, each integrated router comprising;

a processor port to communicate the message between the coupled processor node and the integrated router;

2N local ports coupled to a plurality of adjacent routers to receive the message from and output the message to the adjacent routers in 2N orthogonal directions, each local port having an identified direction, said each local port further comprising a local input to receive the message from the identified direction and a local output to output the message to the identified direction;

M express ports, 2N>M>=1, coupled to at least one non-adjacten router to receive the message from and output the message to the non-adjacent routers in less than 2N orthogonal directions, each express port having an identified direction, said each express port further including an express input to receive the message from the identified direction and an express output to output the message to the identified direction;

a message status unit coupled to said each local port and said each express input, said message status unit to select a direction to route the message, and if said direction to route the message is not equal to the directions identified by the express ports of the router, said message status unit to output the message through the local output having an identified direction equal to the direction to route the message; and a routing logic unit coupled to the message status unit, said routing logic unit further coupled to said each express port and said each local port having the same identified direction as said each express port, and if said direction to route the message is equal to the directions identified by the express ports of the router, said routing logic unit selectively outputting the message through the express output or the local output in said direction to route the message, said routing logic unit further comprising logic to select the express output to output the received message if the remaining distance in said direction to route the message is greater than a value D, where D is indicative of a number of processor nodes between the router and the destination processor node in said direction to route the message, D having a value of at least one.

5. The network of claim 4, the message status unit further comprising logic for determining a remaining distance to the destination processor node to be traveled by the message in each identified direction.

6. The network of claim 4, the routing logic unit further comprising logic to select the local port for outputting the message if a remaining distance in the selected direction is less than or equal to a value D, where D is indicative of a number of processor nodes in the selected direction between the router and the destination processor node, D having a value of at least one.

7. The network of claim 4, in which no two adjacent routers comprise express ports with the same identified direction.

8. In an N-dimensional network comprising a plurality of processor nodes and a plurality of integrated routers, N having a value of at least one, each integrated router coupled to a processor node, said each integrated router including 2N local ports to receive a message from and output the message to a plurality of adjacent routers in 2N orthogonal directions, each local port having an identified direction, said each integrated router further including M express ports, 2N>M>=1, each express port to receive the message from and output the message to at least one non-adjacent router in less than 2N orthogonal directions, said each express port having an identified direction, a method for routing the message from a source processor node of the plurality of processor nodes to a destination processor node of the plurality of processor nodes, the method comprising the steps of:

if an integrated router of the plurality of integrated routers is connected to the source processor node for the message, receiving the message from the source processor node;

if the integrated router is not connected to the source processor node, the integrated router receiving the message through a local port or an express port of the integrated router;

the integrated router determining whether the integrated router is coupled to the destination processor node;

if the integrated router is coupled to the destination processor node, the integrated router communicating the message to the destination processor node;

if the integrated router is not coupled to the destination processor node;
 the integrated router selecting a selected direction in which to route the message;

the integrated router determining whether the selected direction is an identified direction of one of the express ports;

if the selected direction is an identified direction of one of the express ports, the integrated router determining whether a remaining distance to the destination processor node to be traveled by the message in the selected direction is greater than a value D, where D is indicative of a number of processor nodes between the integrated router and the destination processor node in the selected direction, D having a value of at least one;

if the remaining distance is greater than the value D, the integrated router outputting the message through the express port having an identified direction that is the same as the selected direction; and if the remaining distance is less than or equal to the value D, the integrated router outputting the message through the local port having an identified direction that is that same as the selected direction;

if the selected direction is not identified by one of the express ports, the integrated router outputting the message through the local port having an identified direction that is that same as the selected direction.

* * * * *

UNITED STATES PATENT AND TRADEMARK OFFICE
CERTIFICATE OF CORRECTION

PATENT NO.    :   5,546,596
DATED         :   August 13, 1996
INVENTOR(S)   :   Alan Geist It is certified that error appears in the above-identified patent and that said Letters Patent is hereby corrected as shown below:

In column 7 at line 62 delete "massage" and insert --message--

In column 8 at line 11 delete "mute" and insert --route--

In column 8 at line 12 delete "muting" and insert --routing--

In column 8 at line 20 delete "massage" and insert --message--

In column 8, at line 20 delete " muting " and insert -- routing --.

Signed and Sealed this

Ninth Day of September, 1997

Attest:

BRUCE LEHMAN

Attesting Officer

Commissioner of Patents and Trademarks